(12) United States Patent
Nakamura

(10) Patent No.: US 12,438,366 B2
(45) Date of Patent: Oct. 7, 2025

(54) MANAGEMENT SERVER AND MANAGEMENT METHOD

(71) Applicant: TOYOTA JIDOSHA KABUSHIKI KAISHA, Toyota (JP)

(72) Inventor: Toru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 503 days.

(21) Appl. No.: 17/934,393

(22) Filed: Sep. 22, 2022

(65) Prior Publication Data

US 2023/0163594 A1 May 25, 2023

(30) Foreign Application Priority Data

Nov. 22, 2021 (JP) .................. 2021-189396

(51) Int. Cl.
*H02J 3/00* (2006.01)
*G06Q 50/06* (2024.01)
*H02J 13/00* (2006.01)

(52) U.S. Cl.
CPC ........ *H02J 3/003* (2020.01); *H02J 13/00007* (2020.01); *G06Q 50/06* (2013.01)

(58) Field of Classification Search
CPC .. H02J 3/003; H02J 13/00007; H02J 2310/12; H02J 2310/60; H02J 3/14; H02J 3/144; H02J 13/00; H02J 13/00004; G06Q 50/06; G06Q 50/00

See application file for complete search history.

(56) References Cited

U.S. PATENT DOCUMENTS

| 2011/0190947 | A1* | 8/2011 | Savelle, Jr. | ............ | A01G 25/16 700/284 |
| 2018/0323643 | A1* | 11/2018 | Arar | ......................... | H02J 3/14 |
| 2021/0216934 | A1* | 7/2021 | Riverso | ................... | H02J 3/381 |

FOREIGN PATENT DOCUMENTS

| JP | 2016140230 | A | * | 8/2016 | ............. | Y02B 70/30 |
| JP | 2018-207745 | A | | 12/2018 | | |

* cited by examiner

*Primary Examiner* — Kamini S Shah
*Assistant Examiner* — Zachary Andrew Cain
(74) *Attorney, Agent, or Firm* — Finnegan, Henderson, Farabow, Garrett and Dunner, LLP

(57) ABSTRACT

A CEMS server manages an amount of demanded electric power of consumer facilities organized into groups. The groups include at least two consumer facilities of which amounts of demanded electric power are correlated with each other. One of the at least two consumer facilities includes an HEMS server that transmits an amount of demanded electric power of the corresponding consumer facility to the CEMS server every first period. The CEMS server stores relationship information indicating a relationship between the amounts of demanded electric power of the at least two consumer facilities. The CEMS server calculates a total amount of demanded electric power of the groups based on the amount of demanded electric power transmitted from the HEMS server and the relationship information and outputs a DR request to the consumer facilities such that the total amount of demanded electric power matches a planned amount of electric power.

8 Claims, 12 Drawing Sheets

30-MINUTE SIMULTANEOUS POWER SUPPLY AND DEMAND
ADJUSTMENT DUE TO DECREASE IN DEMANDED ELECTRIC POWER

FIG. 8

CONSUMER FACILITY DB

| CONSUMER FACILITY ID | PRESENCE/ABSENCE OF HEMS SERVER | POWER DEMAND CHANGE | DEMAND INFORMATION ||
|---|---|---|---|---|
| | | | TIME PERIOD OF DEMAND FOR ELECTRIC POWER | POWER ADJUSTMENT RESOURCE TYPE |
| A1 | YES | B11 (FIRST DAY) | C1 | D1 |
| | | B12 (SECOND DAY) | | |
| | | ... | | |
| A2 | NO | B21 (FIRST DAY) | C2 | D2 |
| | | B22 (SECOND DAY) | | |
| A3 | YES | ... | ... | ... |
| ... | ... | ... | ... | ... |

FIG. 10

GROUP DB

| GROUP ID | CONSTITUENT CONSUMER FACILITY | RELATIONSHIP INFORMATION |
|---|---|---|
| G1 | A1 (MAIN) | — |
| | A13 | K13 (A13=A1) |
| | A25 | K25 (A25=A1×0.7) |
| | ⋮ | ⋮ |
| G2 | A4 (MAIN) | — |
| | A6 | K6 (A6=A1) |
| | ⋮ | ⋮ |
| G3 | ⋮ | ⋮ |

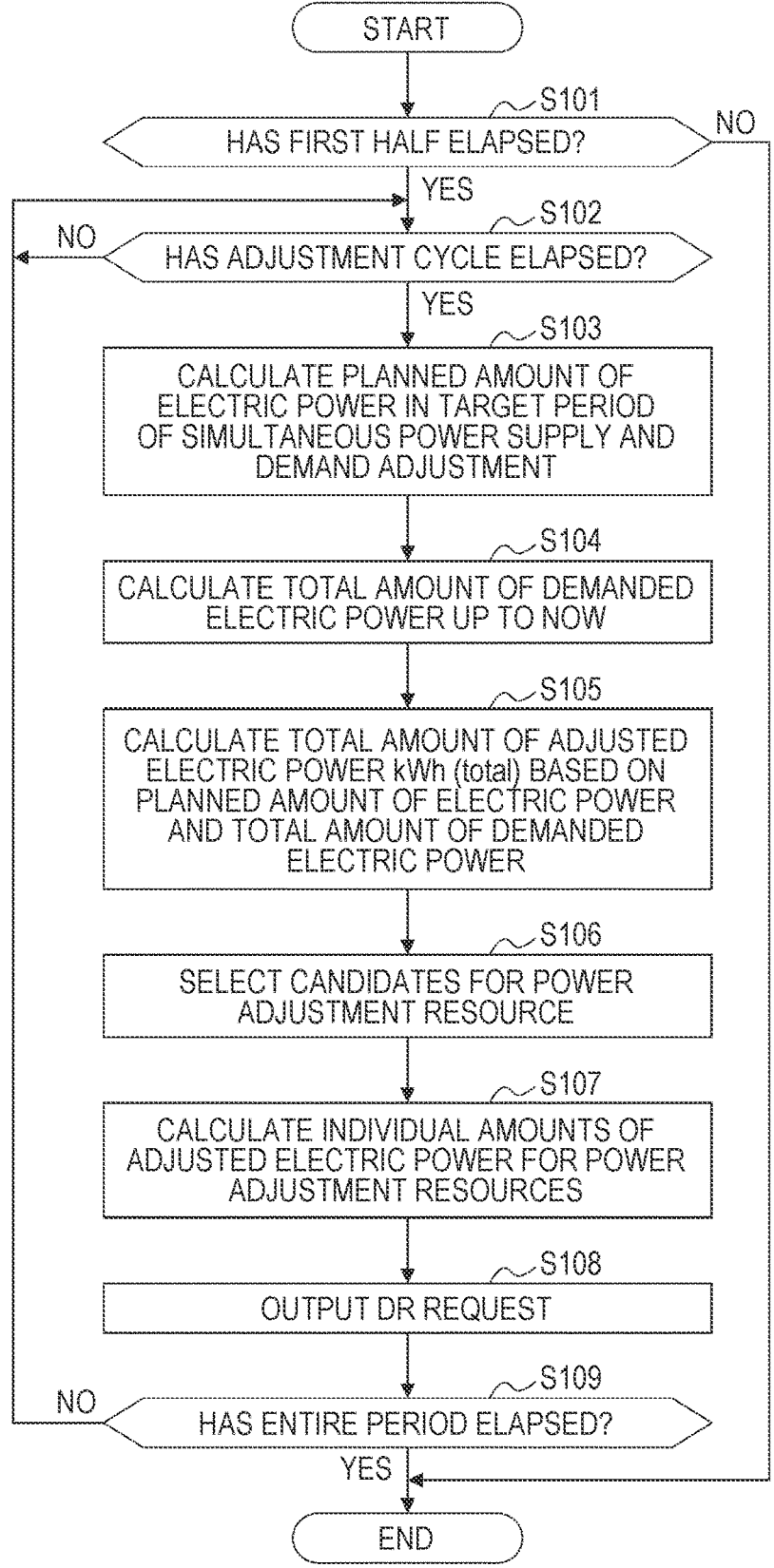

MANAGEMENT SERVER AND MANAGEMENT METHOD

CROSS-REFERENCE TO RELATED APPLICATION

This application claims priority to Japanese Patent Application No. 2021-189396 filed on Nov. 22, 2021, incorporated herein by reference in its entirety.

BACKGROUND

1. Technical Field

The present disclosure relates to a management server and a management method.

2. Description of Related Art

So-called simultaneous power supply and demand adjustment of substantially matching an amount of electric power demanded in a power network and an amount of electric power supplied from a power system to the power network is performed in a server that manages demand for electric power in consumer facilities. Japanese Unexamined Patent Application Publication No. 2018-207745 (JP 2018-207745 A) discloses a technique of predicting demand for electric power for simultaneous power supply and demand adjustment.

SUMMARY

In order to calculate an amount of electric power which is consumed in a consumer facility, a server receives an amount of demanded electric power from the consumer facility. However, when there is a plurality of consumer facilities, or the like, the server needs to receive an amount of demanded electric power from the plurality of consumer facilities. However, in the technique disclosed in JP 2018-207745 A, cases in which there is a plurality of consumer facilities and the like are not considered, and there may be a problem in that the burden of a process of calculating a total amount of demanded electric power of the consumer facilities increases.

The present disclosure provides a management server and a management method that can curb an increase in a load of a process of calculating a total amount of electric power demanded in a plurality of consumer facilities.

(1) A management server according to the present disclosure manages an amount of demanded electric power of a plurality of consumer facilities. The management server includes a processor and a memory configured to store a program which is able to be executed by the processor. The plurality of consumer facilities is organized into a plurality of groups. The plurality of groups includes a group including at least two consumer facilities of which amounts of demanded electric power are correlated with each other. One consumer facility of the at least two consumer facilities includes a first communication system configured to transmit an amount of demanded electric power of the corresponding consumer facility to the management server every first period. The memory is configured to store relationship information indicating a relationship between the amounts of demanded electric power of the at least two consumer facilities. The processor is configured to calculate a total amount of demanded electric power of the plurality of groups based on the amount of demanded electric power transmitted from the first communication system and the relationship information and to output a demand-response request to the plurality of consumer facilities such that the total amount of demanded electric power matches a planned amount of electric power.

With this configuration, it is possible to curb an increase in a burden of a process load for predicting demand for electric power in consumer facilities.

(2) The plurality of consumer facilities may include a second communication system configured to transmit an amount of demanded electric power for the corresponding consumer facility to the management server every second period longer than the first period.

With this configuration, even when grouping is performed such that the plurality of consumer facilities includes the second communication system, it is possible to curb an increase in the burden of a process load for predicting a total amount of electric power demanded in consumer facilities.

(3) The processor may be configured to calculate the total amount of demanded electric power every third period shorter than the second period.

With this configuration, since the total amount of demanded electric power is calculated every third period, it is possible to calculate the total amount of demanded electric power at intervals of a relatively short cycle and to output a detailed response request.

(4) The plurality of groups may include a group including one consumer facility including the first communication system.

With this configuration, even when there is a group including one consumer facility including the first communication system, it is possible to curb an increase in the burden of a process load for predicting a total amount of electric power demanded in consumer facilities.

(5) The processor may be configured to organize the plurality of consumer facilities into the plurality of groups based on demand information correlated with the amounts of demanded electric power of the plurality of consumer facilities.

With this configuration, it is possible to perform grouping based on demand information correlated with an amount of demanded electric power.

(6) The demand information may include a demand time period of electric power in each consumer facility.

With this configuration, it is possible to perform grouping based on a demand time period of electric power in a consumer facility.

(7) At least one consumer facility out of the plurality of consumer facilities may include a power adjustment resource that is able to be used to adjust electric power. The demand information may include a type of the power adjustment resource.

With this configuration, it is possible to perform grouping based on types of power adjustment resources.

(8) A management method according to the present disclosure is performed by a management server that manages an amount of demanded electric power of a plurality of consumer facilities. The plurality of consumer facilities is organized into a plurality of groups. The plurality of groups includes a group including at least two consumer facilities of which amounts of demanded electric power are correlated with each other. One consumer facility of the at least two consumer facilities includes a first communication system configured to transmit an amount of demanded electric power of the corresponding consumer facility to the management server every first period. The management method includes: calculating a total amount of demanded electric power of the plurality of groups based on relationship information indicating a relationship between the amounts of demanded electric power of the at least two consumer facilities and the amount of demanded electric power transmitted from the first communication system and outputting a demand-response request to the plurality of consumer facilities such that the total amount of demanded electric power matches a planned amount of electric power.

With this configuration, it is possible to curb an increase in the burden of a process load for predicting demand for electric power in consumer facilities.

According to the present disclosure, it is possible to curb an increase in the burden of a process of calculating a total amount of electric power demanded in consumer facilities.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a functional block diagram of a CEMS and the like;

FIG. 8 is a diagram illustrating an example of a consumer facility DB;

FIG. 10 is a diagram illustrating an example of a group DB;

FIG. 14 is a flowchart illustrating a simultaneous power supply and demand adjustment process.

DETAILED DESCRIPTION OF EMBODIMENTS

Figure 1:
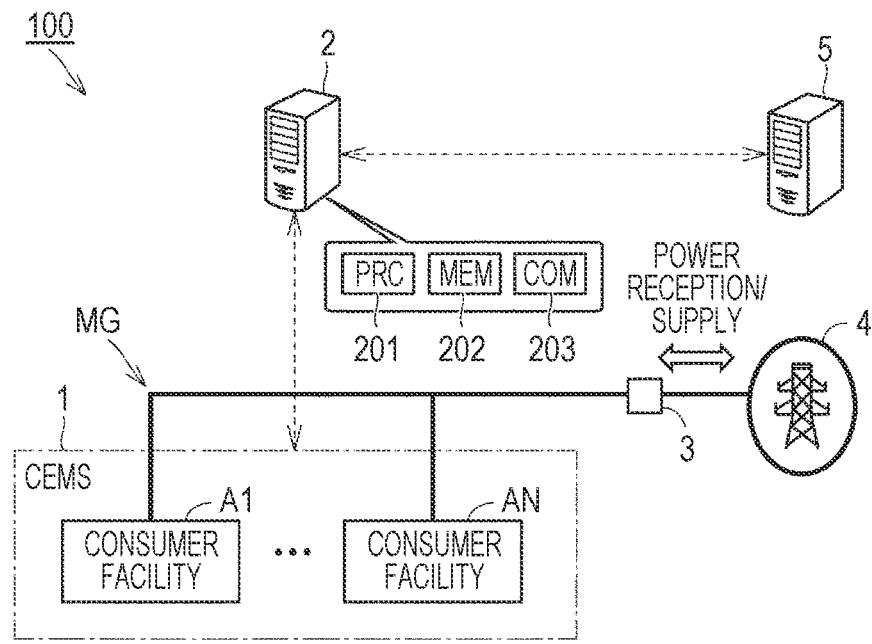
FIG. 1 is a diagram schematically illustrating a configuration of a power management system according to an embodiment of the present disclosure.

Hereinafter, an embodiment of the present disclosure will be described in detail with reference to the accompanying drawings. The same or corresponding elements in the drawings will be referred to by the same reference signs, and description thereof will not be repeated.

Entire Configuration of Power Management System

FIG. 1 is a diagram schematically illustrating a configuration of a power management system according to an embodiment of the present disclosure. A power management system 100 includes a CEMS 1, a CEMS server 2, a power receiving and transforming facility 3, a power system 4, and a power transmission/distribution company server 5. "CEMS" means "community energy management system" or "city energy management system." The power management system 100 typically corresponds to a virtual power plant (VPP).

The CEMS 1 includes N (where N is an integer equal to or greater than 2) consumer facilities. Consumer facilities include factories, buildings, and homes. In this embodiment, the consumer facilities are homes. A consumer facility is also referred to as a "consumer."

Each consumer facility includes a load 13 which will be described later. The consumer facility receives electric power which is consumed in the load 13 or the like from a microgrid MG. The consumer facility is constituted by a home energy management system (HEMS). The HEMS is a system that manages demand and supply of electric power which is used in the corresponding home. The load 13 includes household loads (such as an air-conditioning facility, an illumination instrument, and other electronic goods) that operate with electric power supplied thereto. The HEMS may include power adjustment resources. A power adjustment resource is a resource that adjusts electric power in response to a DR request which will be described later. The power adjustment resource performs inputting of electric power (charging) or outputting of electric power (discharging). Examples of the power adjustment resource include a solar panel, a household heat pump system, a household cogeneration system, and a household storage battery. When the load 13 can adjust electric power consumed therein in response to a DR request which will be described later, the load 13 is also included in the power adjustment resource.

The HEMS additionally includes an HEMS server that can interactively communicate with the CEMS server 2. In the CEMS 1, a microgrid MG is constructed by such elements. The microgrid MG corresponds to an example of a "power network" in the claims. The microgrid MG supplies electric power to a household load.

When a consumer facility is a factory, the consumer facility is constituted by a factory energy management system (FEMS). The FEMS is a system that manages reception and supply of electric power used in the factory. The FEMS includes a factory building (which includes an air-conditioning facility and an illumination instrument) and an industrial facility (such as a production line) that operate with electric power supplied from the microgrid MG. Although not illustrated, the FEMS may include a power generation facility (such as a power generator or a solar panel) installed in the factory. Electric power generated by the power generation facility may be supplied to the microgrid MG. The FEMS may include a power generation facility (such as a solar panel) or may include a heat sink system (such as a waste heat recovery system and a heat storage system). The FEMS may additionally include an FEMS server that can interactively communicate with the CEMS server 2.

When a consumer facility is a building, the consumer facility is constituted by a building energy management system (BEMS). The BEMS is a system that manages reception and supply of electric power used in the building such as an office or a commercial facility. The BEMS includes an air-conditioning facility and an illumination instrument installed in the building. The BEMS may include a power generation facility and/or a heat sink system. The BEMS may additionally include a BEMS server that can interactively communicate with the CEMS server 2.

Although not particularly illustrated, a power adjustment resource may include at least one of a power generator, a naturally varying power source, an energy storage system (ESS), electric vehicle supply equipment (EVSE), a vehicle, and a heat storage system.

The power generator is a power generation facility that does not depend on weather conditions and outputs generated electric power to the microgrid MG. The power generator may include a steam turbine power generator, a gas turbine power generator, a diesel engine power generator, a gas engine power generator, a biomass power generator, or a stationary fuel cell battery. The power generator may include a cogeneration system that uses heat generated at the time of generation of electric power.

The naturally varying power source is a power generator facility of which a power output varies depending on weather conditions, and outputs the generated electric power to the microgrid MG. The naturally varying power source may be, for example, a solar panel power generation facility (a solar panel), and the naturally varying power source may include a wind power generation facility instead of or in addition to the solar panel power generation facility.

The energy storage system is a stationary power storage device that stores electric power generated by the naturally varying power source or the like. The power storage device is a secondary battery such as a lithium ion battery or a nickel hydride battery and, for example, a traveling battery mounted in a vehicle in the past (a recycled product) may be used. Here, the energy storage system is not limited to a secondary battery, but may be a power-to-gas facility that produces gas fuel (such as hydrogen or methane) using surplus electric power.

The electric vehicle supply equipment (EVSE) is a charging stand configured to charge a vehicle. The EVSE may be a household charger. The EVSE may be electrically connected to the microgrid MG and configured to discharge (supply) electric power to the microgrid MG.

The vehicle is specifically a plug-in hybrid vehicle (PHV) or an electric vehicle (EV). The vehicle is configured to receive electric power from the microgrid MG (external charging) by connecting a charging cable extending from a charging facility 17 to an inlet (not illustrated) of the vehicle. The vehicle may be configured to supply electric power to the microgrid MG (external supply of electric power) by connecting the charging cable to an outlet (not illustrated) of the vehicle.

The heat storage system includes a power storage tank provided between a heat source and a load (such as an air-conditioning facility) and is configured to temporarily store a liquid medium in the heat storage tank in a thermally insulated state. Generation and consumption of heat may be made to be temporally different using the heat storage system. For example, heat generated by consuming electric power to operate a heat source at nighttime may be stored in the heat storage tank and the heat may be consumed to perform air conditioning in the daytime.

The CEMS server 2 is a computer that manages power adjustment resources in the CEMS 1. The CEMS server 2 includes a control device 201, a storage device 202, and a communication device 203. The control device 201 includes a processor and is configured to perform a predetermined arithmetic process. The storage device 202 includes a memory that stores a program which is executed by the control device 201 and stores various types of information (such as a map, a relational expression, and a parameter) which are used in the program. The storage device 202 includes a database (DB) which will be described later and stores data associated with electric power (such as a power generation history and a power consumption history) of a system or a facility included in the CEMS 1. The communication device 203 includes a communication interface and is configured to communicate with the outside (such as another server).

The CEMS server 2 may be an aggregator server. An aggregator is an electricity provider that binds a plurality of power adjustment resources and provides an energy management service. In the present disclosure, the CEMS server 2 corresponds to a "management server" in the claims. The management server may be another server.

The power receiving and transforming facility 3 is provided at a power receiving point (a network connection point) and is configured to switch between synchronization (connection) of the microgrid MG and desynchronization (disconnection) between the microgrid MG and the power system 4. The power receiving and transforming facility 3 includes a high-voltage (primary-side) switch, a transformer, a protection relay, a meter, and a control device, none of which is illustrated. When the microgrid MG is connected to the power system 4, the power receiving and transforming facility 3 receives AC electric power of a particular high voltage (a voltage over 7000 V) from the power system 4, steps the received electric power down, and supplies the resultant electric power to the microgrid MG.

The power system 4 is a power network constructed by a power generator and a power transmission/distribution facility. In this embodiment, a power company serves as both a power generation company and a power transmission/distribution company. The power company corresponds to a general power transmission/distribution company, corresponds to a manager of the power system 4, and repairs and manages the power system 4.

The power transmission/distribution company server 5 is a computer that belongs to the power company and manages reception and supply of electric power in the power system 4. The power transmission/distribution company server 5 is also configured to interactively communicate with the CEMS server 2.

Simultaneous Power Supply and Demand Adjustment

A contract for an amount of electric power supplied from the power system 4 to the microgrid MG every predetermined period (for example, at intervals of 30 minutes) has been made between a manager of the CEMS 1 and a power company repairing and managing the power system 4. According to this contract, it is required for the CEMS server 2 to adjust a total amount of demanded electric power such that an actual amount of electric power supplied from the power system 4 to the microgrid MG (a total amount of demanded electric power) substantially matches an amount of supplied electric power planned in advance (a planned amount of electric power). Control for this adjustment is referred to as "simultaneous power supply and demand adjustment," and particularly, the adjustment of which a period is 30 minutes is referred to as "30-minute simultaneous power supply and demand adjustment." In other words, simultaneous power supply and demand adjustment is control for causing the total amount of demanded electric power to match the planned amount of electric power. The total amount of demanded electric power is a sum value of amounts of demanded electric power in N consumer facilities. An amount of demanded electric power in a consumer facility is typically a sum value of an amount of electric power consumed in a load of the consumer facility and an amount of electric power stored in a power adjustment resource therein.

A target period of simultaneous power supply and demand adjustment is not limited to 30 minutes. The target period of simultaneous power supply and demand adjustment may be a time period shorter than 30 minutes (for example, 10 minutes) or may be a time period longer than 30 minutes (for example, 1 hour). The target period of simultaneous power supply and demand adjustment can be arbitrarily determined by a contract.

Figure 2:
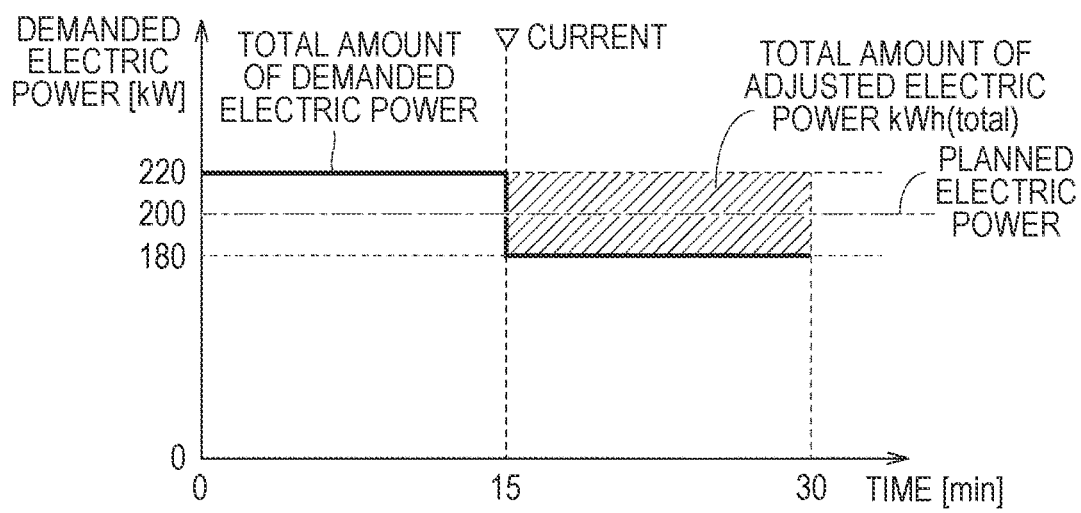
FIG. 2 is a timing chart illustrating an example of simultaneous power supply and demand adjustment according to the embodiment.

FIG. 2 is a timing chart illustrating an example of 30-minute simultaneous power supply and demand adjustment according to the embodiment. In FIG. 2, the horizontal axis represents an elapsed time (unit: minute). An initial time (time=0) is a start time of 30-minute simultaneous power supply and demand adjustment. The vertical axis represents a total amount of demanded electric power in the power system 4 (an amount of electric (unit: kW) supplied to the microgrid MG).

For example, it is assumed that an amount of electric power supplied from the power system 4 to the microgrid MG for 30 minutes (an amount of demanded electric power) is determined to be 100 kWh. In this case, when supply electric power is assumed to be constant, the supply electric power is 200 kW. In the drawing, the supply electric power is described as "planned electric power" (see a one-dot chain line).

In this example, the CEMS server 2 ascertains an amount of electric power supplied from the power system 4 to the microgrid MG at a time point at which 15 minutes which is the first half of the target period of simultaneous power supply and demand adjustment has elapsed. For simplification, it is assumed that the actual supply electric power (the total amount of demanded electric power) is fixed to 220 kW (see a bold solid line). In this case, since the total amount of demanded electric power at the time of ending of the period of simultaneous power supply and demand adjustment is predicted to be greater than the planned amount of electric power in letting things take their course, an average amount of supplied electric power for 15 minutes which is the second half of the target period is set to 180 kW. Accordingly, the CEMS server 2 feedback-controls various power adjustment resources in the CEMS 1 by outputting a demand response (DR) request to the power adjustment resources such that the supply electric power decreases from 220 kW to 180 kW.

In this embodiment, the total amount of demanded electric power is calculated every predetermined adjustment cycle. In this embodiment, the adjustment cycle is "1 minute." The adjustment cycle corresponds to a "third period" in the claims. The adjustment period is also mentioned in Step S102 of FIG. 14 which will be described later.

Although not particularly illustrated, at the time point at which 15 minutes which is the first half of the target period of simultaneous power supply and demand adjustment has elapsed, the amount of supplied electric power may be less than the planned amount of electric power. For example, the amount of supplied electric power is 180 kW. In this case, since the total amount of demanded electric power at the time of ending of the period of simultaneous power supply and demand adjustment is predicted to be less than the planned amount of electric power in letting things take their course, the average amount of supplied electric power for 15 minutes which is the second half of the target period is set to 220 kW. Accordingly, the CEMS server 2 feedback-controls various power adjustment resources in the CEMS 1 by outputting a DR request to the power adjustment resources such that the supply electric power increases from 180 kW to 220 kW. In this way, the CEMS server 2 can appropriately adjust various types of electric power (such as generated electric power, stored electric power, and consumed electric power) in the CEMS 1 and observe the contract.

Communication System

Figure 3:
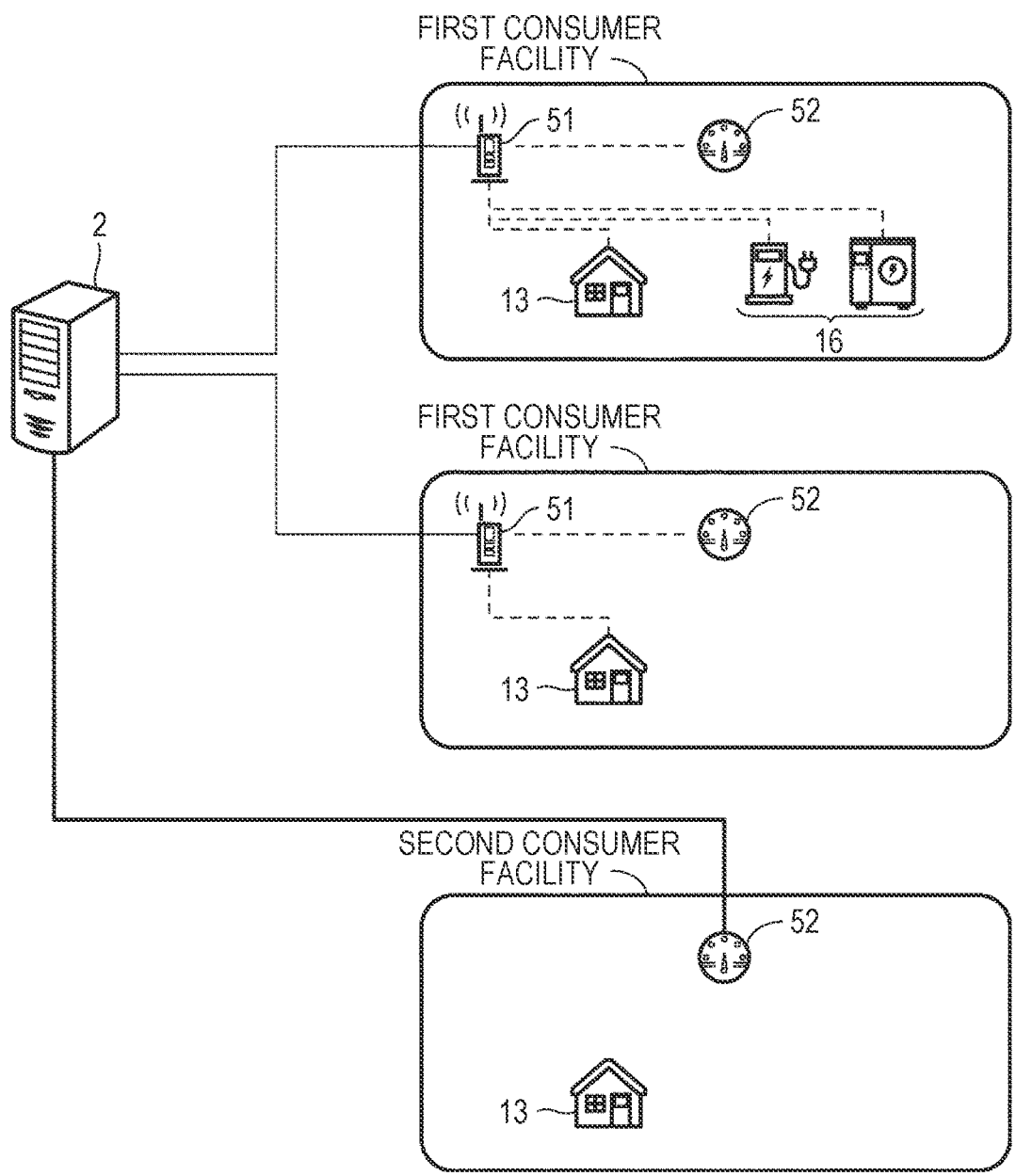
FIG. 3 is a diagram illustrating a communication system.

A communication system will be described below. FIG. 3 is a diagram illustrating the communication system. In the example illustrated in FIG. 3, the CEMS server 2 and a first consumer facility and a second consumer facility out of N consumer facilities are illustrated.

The first consumer facility is a consumer facility including an HEMS server 51. The second consumer facility is a consumer facility not including an HEMS server 51. In this embodiment, all of the N consumer facilities include a smart meter 52.

The smart meter 52 detects an amount of demanded electric power in equipment in the consumer facility to which the smart meter 52 belongs. Here, the smart meter 52 detects the amount of demanded electric power every 30 minutes due to a problem in function or the like. In this way, the cycle in which the smart meter 52 detects the amount of demanded electric power is a relatively long period due to a problem in function of the smart meter 52 or the like. In this embodiment, the smart meter 52 temporarily transmits the detected amount of demanded electric power to another device (not illustrated). The other device transmits the transmitted amount of demanded electric power to the CEMS server 2 every predetermined cycle. The predetermined cycle is 30 minutes. That is, the CEMS server 2 acquires the amount of demanded electric power from the smart meter 52 every 60 minutes. Sixty minutes corresponds to a "second period" in the claims. The smart meter 52 and the other device correspond to a "second communication system" in the claims. Accordingly, the second communication system transmits the amount of demanded electric power in the consumer facility to which the second communication system belongs to the CEMS server 2 every second period.

On the other hand, the HEMS server 51 detects, in every second, an amount of demanded electric power in equipment in a consumer facility to which the HEMS server 51 belongs and transmits the detected amount of demanded electric power to the CEMS server 2. That is, the CEMS server 2 acquires the amount of demanded electric power from the HEMS server 51 every second. One second corresponds to a "first period" in the claims. The HEMS server 51 corresponds to a "first communication system" in the claims. Accordingly, the first communication system transmits the amount of demanded electric power in the consumer facility to which the first communication system belongs to the CEMS server 2 every first period.

As described above, in order for the CEMS server 2 to achieve simultaneous power supply and demand adjustment, it is preferable that the CEMS server 2 acquire an amount of demanded electric power from a consumer facility every minute (every third period). Accordingly, when N consumer facilities include a consumer facility (a second consumer facility) not including the HEMS server 51, the CEMS server 2 has difficulty achieving simultaneous power supply and demand adjustment for the N consumer facilities.

Accordingly, it is conceivable that the HEMS server 51 be added to the second consumer facility. However, when the HEMS server 51 is added to the second consumer facility, there may be a problem in that costs increase.

Therefore, in this embodiment, the CEMS server 2 organizes the N consumer facilities to the following groups in advance (see Step S2 in FIG. 12 which will be described later) before simultaneous power supply and demand adjustment is performed (see Step S4 in FIG. 12 which will be described later). One group includes at least one first consumer facility (a consumer facility including the HEMS server 51). In one group, the first consumer facility is also referred to as a "primary consumer facility," and the other consumer facilities are also referred to as "secondary consumer facilities." In one group, an amount of demanded electric power in the primary consumer facility has a relationship with an amount of demanded electric power in the secondary consumer facilities as will be described later.

As illustrated in FIG. 3, a plurality of consumer facilities includes a consumer facility including a power adjustment resource 16 and a consumer facility not including a power adjustment resource 16. In the example illustrated in FIG. 3, a first consumer facility including a power adjustment resource 16, a first consumer facility not including a power adjustment resource 16, and a second consumer facility not including a power adjustment resource 16 are illustrated.

Figure 4:
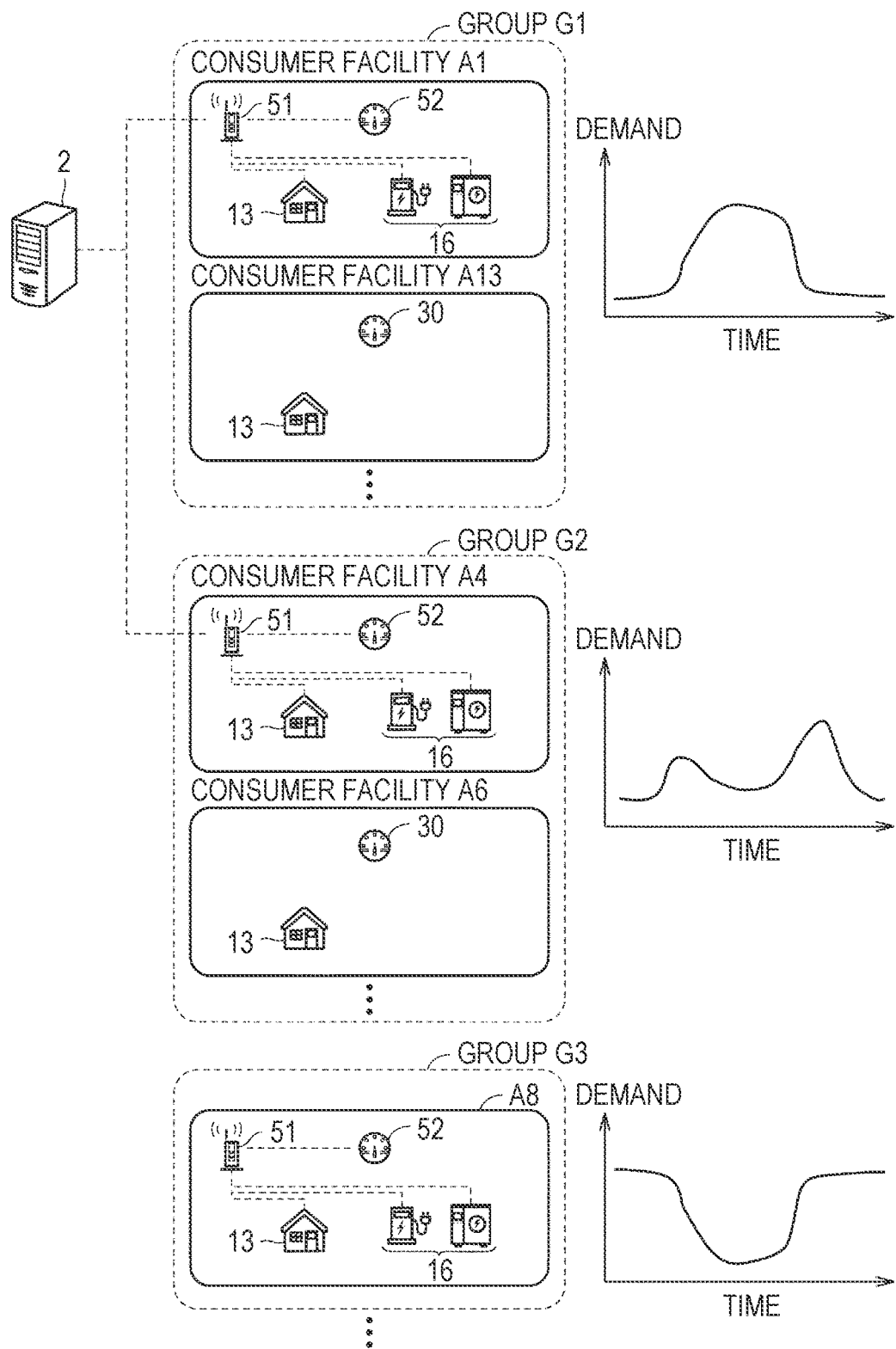
FIG. 4 is a diagram illustrating groups of consumer facilities.

FIG. 4 is a diagram illustrating groups of consumer facilities. In the example illustrated in FIG. 4, Group G1, Group G2, and Group G3 are illustrated. A graph of an amount of demanded electric power in consumer facilities included in each group is illustrated on the right side of the corresponding group. The graph represents a change of the amount of demanded electric power in a predetermined period (one day in this embodiment). The horizontal axis of the graph represents the time, and the vertical axis represents the amount of demanded electric power. The origin of the horizontal axis denotes 00:00, and the right end denotes 00:00 on the next day. That is, one graph denotes a change of the amount of demanded electric power in 24 hours.

In the example illustrated in FIG. 4, changes of the amount of demanded electric power in one or more consumer facilities constituting each group are the same for the group. For example, changes of the amount of demanded electric power in a consumer facility A1 and a consumer facility A13 are the same for Group G1.

Group G1 includes the consumer facility A1 and the consumer facility A13. The consumer facility A1 is a consumer facility including the HEMS server 51. The consumer facility A13 is a consumer facility not including the HEMS server 51. In the change of the amount of demanded electric power correlated with Group G1, the amount of demanded electric power is smaller in time periods of morning and evening, and the amount of demanded electric power is larger in time periods of the day time. That is, the consumer facilities included in Group G1 are, for example, stores or offices.

Group G2 includes a consumer facility A4 and a consumer facility A6. The consumer facility A4 is a consumer facility including the HEMS server 51. The consumer facility A6 is a consumer facility not including the HEMS server 51. In the change of the amount of demanded electric power correlated with Group G2, the amount of demanded electric power is larger in the time periods of morning and evening, and the amount of demanded electric power is smaller in the time periods of the day time. That is, the consumer facilities included in Group G2 are, for example, facilities of a dual-income family.

Group G3 includes only a consumer facility A8. The consumer facility A8 is a consumer facility including the HEMS server 51. In the change of the amount of demanded electric power correlated with Group G3 (that is, the consumer facility A8), the amount of demanded electric power is larger in time periods of early morning and midnight, and the amount of demanded electric power is smaller in the other time periods. That is, the consumer facility A8 included in Group G3 are, for example, facilities performing an overnight operation.

Although not illustrated in FIG. 4, one group may include two or more first consumer facilities.

By performing such grouping, a change of the amount of demanded electric power in a primary consumer facility belonging to one group and a change of the amount of demanded electric power in a secondary consumer facility (another consumer facility) belonging to the one group are estimated to be the same. Accordingly, the CEMS server 2 acquires the amount of demanded electric power from the HEMS server 51 of the primary consumer facility belonging to one group every second in simultaneous power supply and demand adjustment. Then, the CEMS server 2 considers the amount of demanded electric power in the primary consumer facility to be the amount of demanded electric power in the primary consumer facility belonging to the group to which the primary consumer facility belongs.

For example, it is assumed that M (where M is an integer equal to or greater than 1) consumer facilities are included in one group. When an amount of demanded electric power is acquired from a primary consumer facility belonging to the one group, the CEMS server 2 can calculate a total amount of demanded electric power in the one group by multiplying the acquired amount of demanded electric power by M.

Functional Block Diagram of CEMS Server 2

Figure 5:
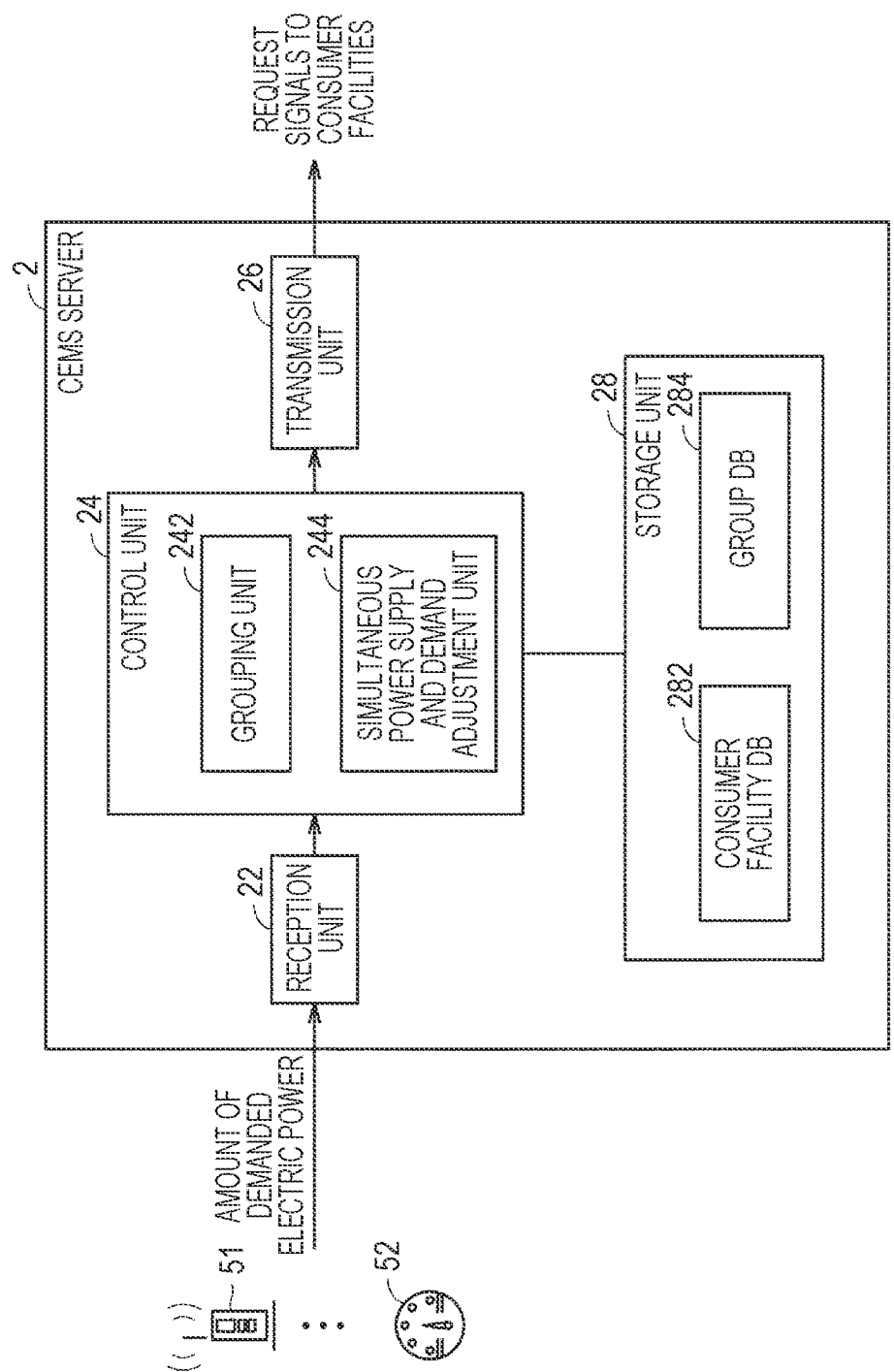

FIG. 5 is a functional block diagram of the CEMS server 2 or the like. In the example illustrated in FIG. 5, the CEMS server 2 includes a reception unit 22, a control unit 24, a transmission unit 26, and a storage unit 28. The reception unit 22 and the transmission unit 26 correspond to the communication device 203 (see FIG. 1). The control unit 24 corresponds to the control device 201. The storage unit 28 corresponds to the storage device 202.

The control unit 24 includes a grouping unit 242 and a simultaneous power supply and demand adjustment unit 244. The grouping unit 242 organizes N consumer facilities into groups in a grouping phase. The simultaneous power supply and demand adjustment unit 244 performs a simultaneous power supply and demand adjustment process in a simultaneous power supply and demand adjustment phase. In this way, the control unit 24 performs a grouping process or a simultaneous power supply and demand adjustment process.

The storage unit 28 includes a consumer facility DB 282 and a group DB. These DBs are also referred to as "tables." These databases will be described later.

The reception unit 22 receives an amount of demanded electric power from the communication systems (the HEMS server 51 or the smart meter 52) of each of N consumer facilities. The acquired amount of demanded electric power is output to the control unit 24.

The transmission unit 26 transmits a signal based on a processing result from the control unit 24 to the consumer facilities. For example, the transmission unit 26 transmits a signal associated with the DR request.

Figure 6:
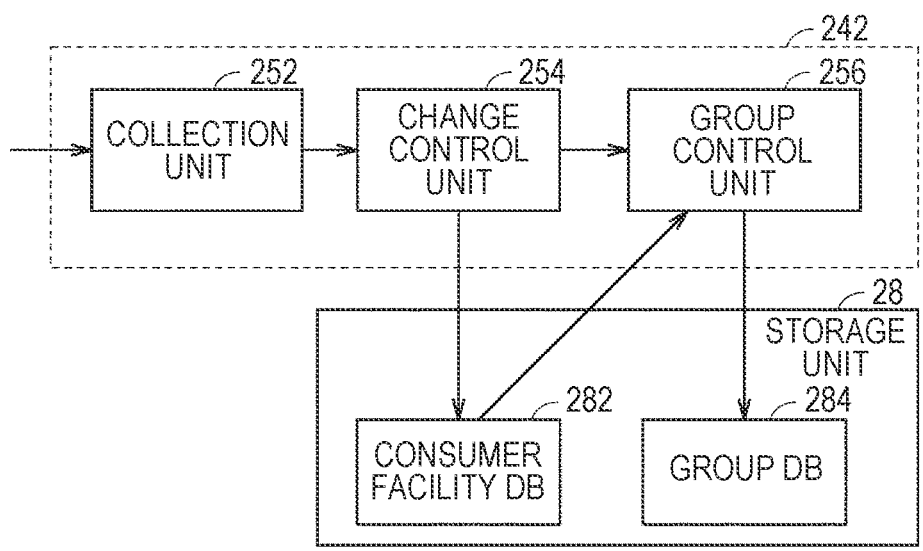
FIG. 6 is a functional block diagram of a grouping unit.

The grouping process (the grouping phase) which is performed by the grouping unit 242 will be described below. FIG. 6 is a functional block diagram of the grouping unit 242. The CEMS server 2 transmits a start signal to communication devices (not illustrated) of N consumer facilities when a collection period starts. The N consumer facilities recognize that the collection period has started by receiving the start signal. When the collection period has started, each of the N consumer facilities transmits an amount of demanded electric power to the CEMS server 2 using the communication system of the corresponding consumer facility every predetermined cycle t. In a first consumer facility, the HEMS server 51 or the smart meter 52 is used as the communication system. In a second consumer facility, the smart meter 52 is used.

The reception unit 22 receives (collects) amounts of demanded electric power for each specific period from all the N consumer facilities in a predetermined collection period. Here, the collection period is, for example, one week, and the predetermined period is one day. That is, the CEMS server 2 acquires seven changes of the amount of demanded electric power (seven graphs) in the collection period.

The collection unit 252 collects the amounts of demanded electric power received by the reception unit 22. The collected amounts of demanded electric power are output to a change control unit 254. The change control unit 254 generates a change of the amount of demanded electric power. Then, the change control unit 254 updates details stored in a consumer facility DB which will be described later. A group control unit 256 performs grouping based on details of the updated consumer facility DB 282. The group control unit 256 constructs a group DB such that the performed grouping is reflected.

Figure 7:
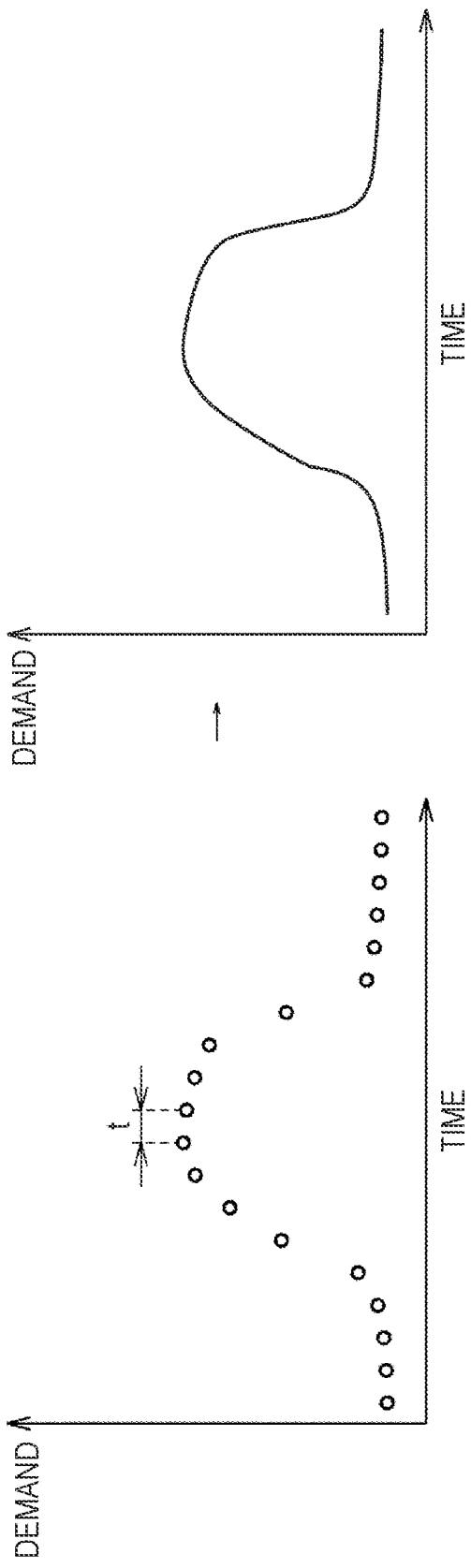
FIG. 7A is a diagram illustrating acquisition of a change of an amount of demanded electric power by the grouping unit.
FIG. 7B is a diagram illustrating acquisition of a change of an amount of demanded electric power by the grouping unit.

FIGS. 7A and 7B are diagrams illustrating a process of acquiring a change of an amount of demanded electric power which is performed by the grouping unit 242. FIG. 7A is a diagram illustrating an example in which the amount of demanded electric power transmitted from one consumer facility every predetermined cycle t is acquired by the grouping unit 242. In the example illustrated in FIG. 7A, the amount of demanded electric power transmitted every predetermined cycle t is plotted. When the amount of demanded electric power is transmitted to the HEMS server 51, the predetermined period t is one second. When the amount of demanded electric power is transmitted to the smart meter 52, the predetermined period t is 60 minutes. The number of plots in the example illustrated in FIG. 7A is different from an actual number.

FIG. 7B illustrates an example of a change of an amount of demanded electric power. The change control unit 254 generates a change of an amount of demanded electric power by connecting the neighboring plots in FIG. 7A using a line. The change control unit 254 generates (seven) power demand changes corresponding to seven days for each of N consumer facilities. That is, the change control unit 254 generates 7×N power demands changes.

The change control unit 254 updates the consumer facility DB 282 based on the generated power demand changes. FIG. 8 is a diagram illustrating an example of the consumer facility DB 282. In this embodiment, consumer facility identifications (IDs) are allocated to N consumer facilities. For example, when a manager of a consumer facility or the like desires to participate in the power management system 100, the manager requests an application for participation to a manger of the power management system 100 or the like. When an application for participation in the power management system 100 from the consumer facility has been approved, the CEMS server 2 gives to a consumer facility ID to the consumer facility.

In the example of FIG. 8, presence/absence of the HEMS server 51, a change of an amount of demanded electric power, a demand time period of electric power, a power adjustment resource type, and the like are correlated with the consumer facility ID.

The presence/absence of the HEMS server 51 is information indicating whether the consumer facility includes the HEMS server 51. As described above, the N consumer facilities include a first consumer facility including the HEMS server 51 and a second consumer facility not including the HEMS server 51. In the example illustrated in FIG. 8, the consumer facility A1 is defined to include the HEMS server 51, the consumer facility A2 is defined not to include the HEMS server 51, and the consumer facility A3 is defined to include the HEMS server 51.

The power demand change is information which is generated and stored by the change control unit 254 (see FIG. 7B). In the example illustrated in FIG. 8, a power demand change B11 of a first day, a power demand change B12 of a second day, and the like are stored as for the consumer facility A1. The power demand change of one day is expressed, for example, by the graph illustrated in FIG. 7B. A power demand change B21 of the first day, a power demand change B22 of the second day, and the like are stored as for the consumer facility A2.

The demand time period of electric power is information indicating a demand time period of electric power in a consumer facility. The change control unit 254 calculates the demand time period of electric power based on the power demand changes of seven days. For example, the change control unit 254 calculates an average time of demand start times of electric power defined in the power demand changes of seven days. The change control unit 254 calculates an average time of demand end times of electric power defined in the power demand changes of seven days. Then, the change control unit 254 calculates a demand time period with the average time of the demand start times as a start time and with the average time of the demand end times as an end time. In the example illustrated in FIG. 8, a demand time period of electric power C1 is stored as for the consumer facility A1. A demand time period of electric power C2 is stored as for the consumer facility A2.

The power adjustment resource type is information indicating the type of a power adjustment resource included in the corresponding consumer facility. Information indicating the power adjustment resource type is, for example, information which is transmitted from a management of a consumer facility at the time of an application for participation in the power management system 100. In the example illustrated in FIG. 8, a type D1 is correlated with the consumer facility A1, and a type D2 is correlated with the consumer facility A2. In this embodiment, the demand time period of electric power and the power adjustment resource type are also referred to as "demand information" together.

When calculation of the power demand changes of seven days and calculation of the demand time periods of electric power are completed, the change control unit 254 outputs a completion signal indicating the completion to the group control unit 256. The group control unit 256 performs a grouping process based on information defined in the completed consumer facility DB. Specifically, the group control unit 256 performs the grouping process based on the power demand changes of seven days and the demand information of each consumer facility.

Figure 9:
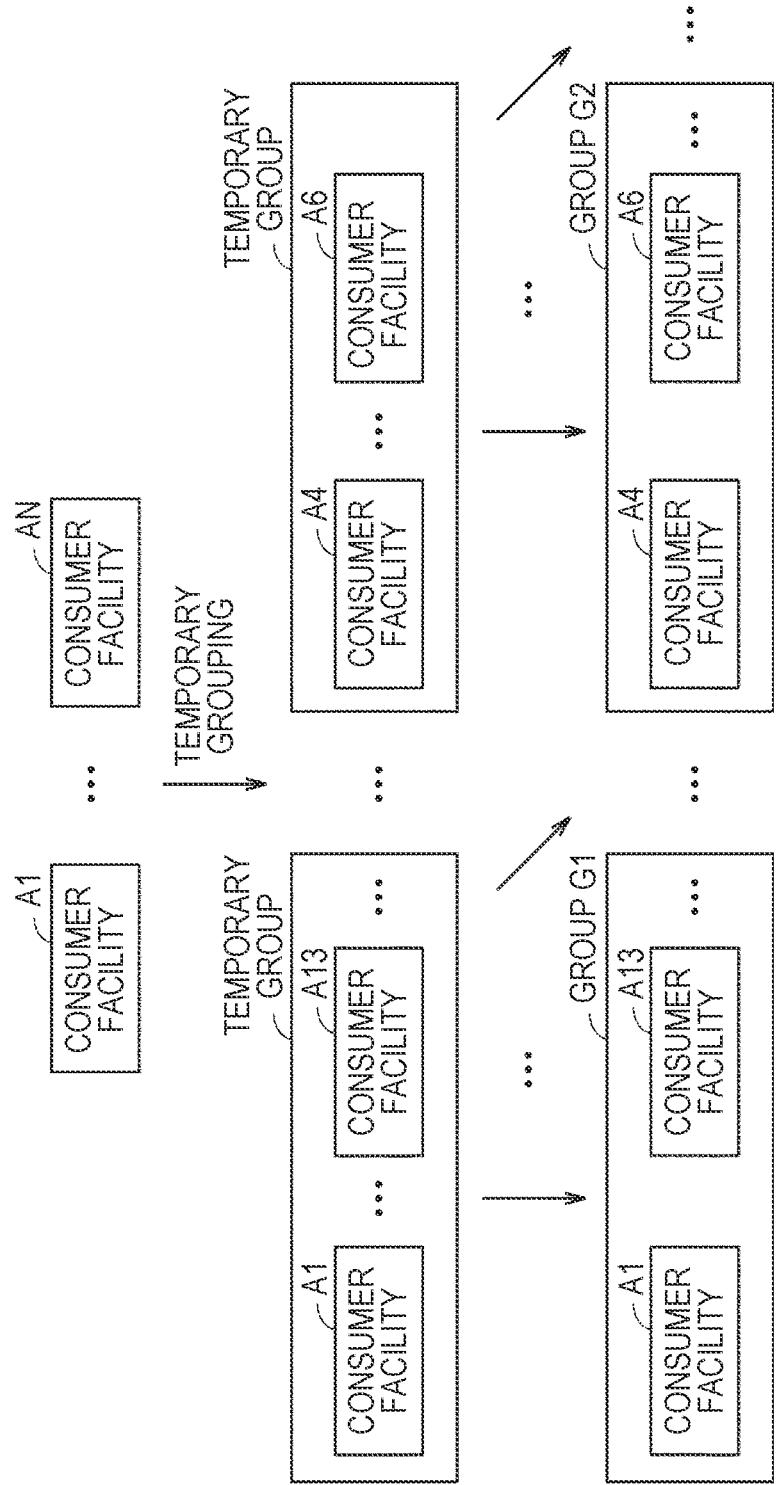
FIG. 9 is a diagram illustrating a grouping process performed by a group control unit.

FIG. 9 is a diagram illustrating the grouping process which is performed by the group control unit 256. In this embodiment, the group control unit 256 performs the grouping process in two-step control.

In this embodiment, the group control unit 256 organizes N consumer facilities into temporary groups based on demand information. As described above, the demand information includes a demand time period of electric power and the power adjustment resource type.

For example, the group control unit 256 organizes one or more consumer facilities of which the demand time periods of electric power and the power adjustment resource types have a relationship with each other into one temporary group. Here, the "demand time periods of electric power have a relationship" means that the start time and the end time defined in the demand time periods are the same or similar and thus the lengths of the demand time periods are the same or similar. The "times are similar" means, for example, that a difference between the times is within a predetermined range (an allowable range). The "power adjustment resource types have a relationship" means that the power adjustment resource types are the same or similar. The "power adjustment resource types are similar" may be set to mean that a difference in the numbers of power adjustment resources is within a predetermined range (an allowable range). The "power adjustment resource types are similar" may be set to mean that performances of the power adjustment resources are similar.

When the temporary grouping ends, the group control unit 256 additionally organizes one temporary group into one or more main groups based on the power demand changes. The group control unit 256 organizes one or more consumer facilities of which the power demand changes have a relationship with each other in one temporary group into one main group. The main group corresponds to a "group" in the claims.

In the example illustrated in FIG. 9, the consumer facility A1 and the consumer facility A13 belong to the main group G1, and the consumer facility A4, the consumer facility A6, and the like belong to the main group G2. The group control unit 256 performs a temporary grouping process and a main grouping process using a predetermined technique. The predetermined technique is, for example, pattern recognition, support vector machine, or artificial intelligence (AI).

The group control unit 256 constructs a group DB in which the grouping results are reflected. FIG. 10 is a diagram illustrating an example of the constructed group DB. As illustrated in FIG. 10, the group control unit 256 allocates group IDs to the organized groups.

In the example illustrated in FIG. 10, the consumer facilities constituting the group G1 include a consumer facility A1, a consumer facility A13, and a consumer facility A25. The consumer facilities constituting the group G2 include a consumer facility A4 and a consumer facility A6.

Each group includes one or more primary consumer facilities. Relationship information is correlated with each secondary consumer facility. Here, the relationship information is information indicating a relationship between a power demand change of a secondary consumer facility corresponding to the relationship information and a power demand change of a primary consumer facility of the group to which the secondary consumer facility belongs.

In the example illustrated in FIG. 10, relationship information K13 of the consumer facility A13 indicates that the power demand change of the consumer facility A1 (primary consumer facility) and the power demand change of the consumer facility A13 (secondary consumer facility) are the same or substantially the same. The "power demand changes of two consumer facilities are substantially the same" means that a difference between the power demand changes of the two consumer facilities is within an allowable range. Relationship information K25 of the consumer facility A25 is information indicating that the power demand change of the consumer facility A25 (primary consumer facility) is a value obtained by multiplying the amount of demanded electric power in the consumer facility A1 (secondary consumer facility) by 0.7.

In this way, by referring to the relationship information, the CEMS server 2 can calculate the amount of demanded electric power in the secondary consumer facility from the power demand change of the primary consumer facility without directly acquiring the amount of demanded electric power in the secondary consumer facility corresponding to the relationship information. In other words, the relationship information is information indicating details of the relationship between the power demand change of the primary consumer facility and the power demand change of the secondary consumer facility. In other words, the relationship information is information for enabling the CEMS server 2 to calculate the amount of demanded electric power in the secondary consumer facility using the amount of demanded electric power in the primary consumer facility of the group to which the secondary consumer facility corresponding to the relationship information belongs. The relationship information may be, for example, information indicating that the power demand change of the primary consumer facility is deviated from the power demand change of the secondary consumer facility by a predetermined time (for example, 1 hour). The CEMS server 2 performs a simultaneous power supply and demand adjustment process using the completed group DB. In this embodiment, it is assumed that N consumer facilities are organized into M groups.

The simultaneous power supply and demand adjustment process which is performed by the simultaneous power supply and demand adjustment unit 244 will be described below. Description will be continued with reference back to FIG. 5. When the simultaneous power supply and demand adjustment unit 244 performs the simultaneous power supply and demand adjustment process, the reception unit 22 acquires an amount of demanded electric power and a group ID to which a primary consumer facility belongs from the HEMS server 51 of the primary consumer facility each of the M groups every first period (1 second in this embodiment). The reception unit 22 does not acquire the amount of demanded electric power from any secondary consumer facility. That is, the reception unit 22 acquires M amounts of demanded electric power and the group IDs corresponding to the M amounts of demanded electric power. The M amounts of demanded electric power and the M group IDs are output to the simultaneous power supply and demand adjustment unit 244 of the control unit 24.

Figure 11:
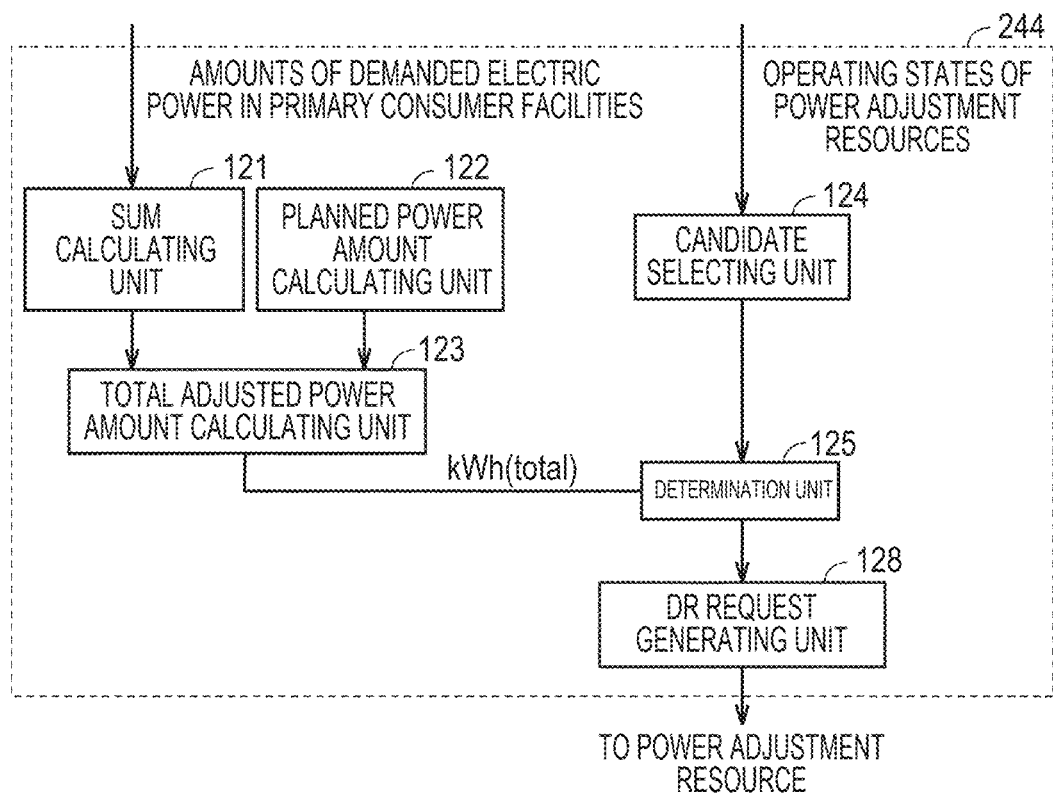
FIG. 11 is a functional block diagram of a simultaneous power supply and demand adjustment unit.

FIG. 11 is a functional block diagram of the simultaneous power supply and demand adjustment unit 244. The simultaneous power supply and demand adjustment unit 244 determines a power adjustment resource which is used to achieve simultaneous power supply and demand adjustment while feeding back various types of electric power from various power adjustment resources in the CEMS 1. The simultaneous power supply and demand adjustment unit 244 includes a sum calculating unit 121, a planned power amount calculating unit 122, a total adjusted power amount calculating unit 123, a candidate selecting unit 124, a determination unit 125, and a DR request generating unit 128.

The sum calculating unit 121 calculates an amount of electric power actually supplied from the power system 4 to the microgrid MG (a total amount of demanded electric power) from an initial time of a target period of simultaneous power supply and demand adjustment of 30 minutes up to now (for example, a time point at which 15 minutes has elapsed). In this embodiment, the sum calculating unit 121 calculates the total amount of demanded electric power with reference to the group DB (see FIG. 10) based on the M amounts of demanded electric power and the M group IDs. More specifically, the sum calculating unit 121 calculates the total amounts of demanded electric power of the M groups based on the amount of demanded electric power transmitted from the HEMS server 51 of the primary consumer facility of each group and the relationship information defined in the group DB.

More specifically, the sum calculating unit 121 acquires an amount of demanded electric power in the consumer facility A1 (primary consumer facility) and the group ID corresponding to the amount of demanded electric power (information indicating the group G1). The sum calculating unit 121 identifies the group corresponding to the group ID in the group DB illustrated in FIG. 10. The sum calculating unit 121 identifies the relationship information of all the secondary consumer facilities in the identified group. The sum calculating unit 121 calculates a sum value of the amounts of demanded electric power in the secondary consumer facilities based on the identified relationship information.

The sum calculating unit 121 acquires the amount of demanded electric power in the consumer facility A1 (primary consumer facility) and the group ID corresponding to the amount of demanded electric power (information indicating the group G1). The sum calculating unit 121 identifies the group G1 corresponding to the group ID in the group DB illustrated in FIG. 10. The sum calculating unit 121 identifies the relationship information of all the secondary consumer facilities in the identified group G1. The sum calculating unit 121 calculates a sum value of the amounts of demanded electric power in the secondary consumer facilities based on the identified relationship information. For example, the sum calculating unit 121 determines that the power demand change of the consumer facility A13 is the same as that of the consumer facility A1 based on the relationship information K13. The sum calculating unit 121 determines that the power demand change of the consumer facility A25 is a change obtained by multiplying the power demand change of the power consumer facility A1 by 0.7 based on the relationship information K25.

Then, the sum calculating unit 121 calculates the amount of demanded electric power in the group to which the primary consumer facility belongs by adding the sum value to the amount of demanded electric power in the primary consumer facility. In the same way, the sum calculating unit 121 calculates the total amount of demanded electric power by calculating the amounts of demanded electric power in all the groups and summing the amounts of demanded electric power in all the groups. The calculated total amount of demanded electric power is output to the total adjusted power amount calculating unit 123.

The planned power amount calculating unit 122 calculates an amount of electric power planned to be supplied from the power system 4 to the microgrid MG for 30 minutes (a planned amount of electric power). The planned amount of electric power is calculated based on a contract which has been made between the manager of the CEMS 1 and a power company. The value of the planned amount of electric power may be calculated and stored in the storage device 202 in advance. The calculated planned amount of electric power is output to the total adjusted power amount calculating unit 123.

The total adjusted power amount calculating unit 123 calculates an amount of electric power which needs to be adjusted using the power adjustment resources in the CEMS 1 based on a difference between the planned amount of electric power and the total amount of demanded electric power from the initial time of 30 minutes up to now. The total adjusted power amount calculating unit 123 calculates the total adjusted amount of electric power kWh (total), for example, using Expression (1).

$$\begin{aligned}\text{total adjusted amount of electric power kWh (total)}\\ =\text{total amount of demanded electric power}-\\ \text{planned amount of electric power}\end{aligned} \quad (1)$$

Here, the total amount of demanded electric power in the right side of Expression (1) is a value which is output from the sum calculating unit 121. The planned amount of electric power in the right side of Expression (1) is a value which is output from the planned power amount calculating unit 122. The total adjusted amount of electric power kWh (total) is one of a positive value, 0, and a negative value.

When the total adjusted amount of electric power kWh (total) is 0, simultaneous power supply and demand adjustment has been achieved. When the total adjusted amount of electric power kWh (total) has a positive value, this is the situation illustrated in FIG. 2. Accordingly, when the total adjusted amount of electric power kWh (total) has a positive value, it is preferable that the amount of demanded electric power be decreased for 15 minutes of the second half. That is, it is preferable that, for example, a charged power adjustment resource discharge electric power.

When the total adjusted amount of electric power kWh (total) has a negative value, this is a situation in which the amount of demanded electric power is lower than the planned amount of electric power. Accordingly, when the total adjusted amount of electric power kWh (total) has a negative value, it is preferable that the amount of demanded electric power be increased for 15 minutes of the second half. That is, it is preferable that, for example, a chargeable power adjustment resource be charged with electric power.

The candidate selecting unit 124 selects candidates for a power adjustment resource which can be used for power adjustment out of various power adjustment resources (such as an energy storage system, a charging facility, a vehicle, a heat storage system, an air conditioning facility, and an illumination instrument) in the CEMS 1. For example, the candidate selecting unit 124 acquires operating states of a plurality of power adjustment resources by communication with the power adjustment resources. Then, the candidate selecting unit 124 excludes a power adjustment resource of which changing of electric power is prohibited (for example, a power adjustment resource which is required to operate with constant electric power) from the candidates and selects a power adjustment resource of which changing of electric power is permitted as a candidate. Information on the selected power adjustment resources is output to the determination unit 125.

The determination unit 125 determines a power adjustment resource of which electric power is to be adjusted from the candidates for a power adjustment resource based on the total adjusted amount of electric power kWh (total) from the total adjusted power amount calculating unit 123 and a predetermined algorithm.

The DR request generating unit 128 generates a DR request for requesting to perform power adjustment using the power adjustment resources determined by the determination unit 125. The generated DR request is output to the corresponding power adjustment resources.

The group DB may be updated periodically (for example, every half year). When the CEMS server 2 identifies that simultaneous power supply and demand adjustment is performed after a period required to construct the group DB (for example, one week as described above), the group DB may be constructed at the time of performing the identification. In this case, simultaneous power supply and demand adjustment is performed based on the constructed group DB.

Control Flow

Figure 12:
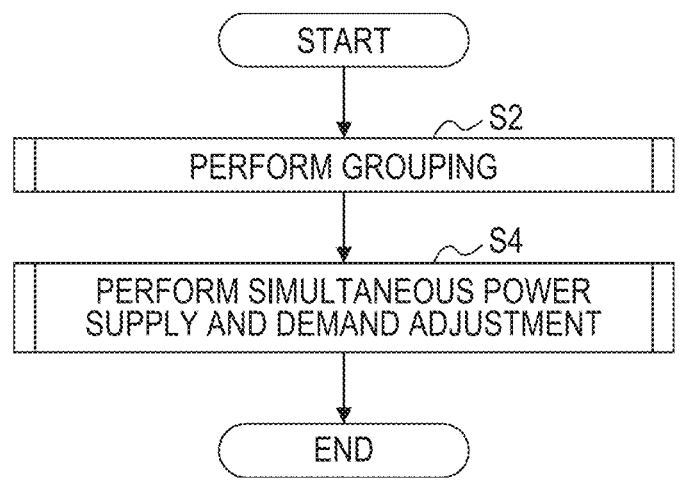
FIG. 12 is a flowchart illustrating an example of a main routine performed by a CEMS server.
Figure 13:
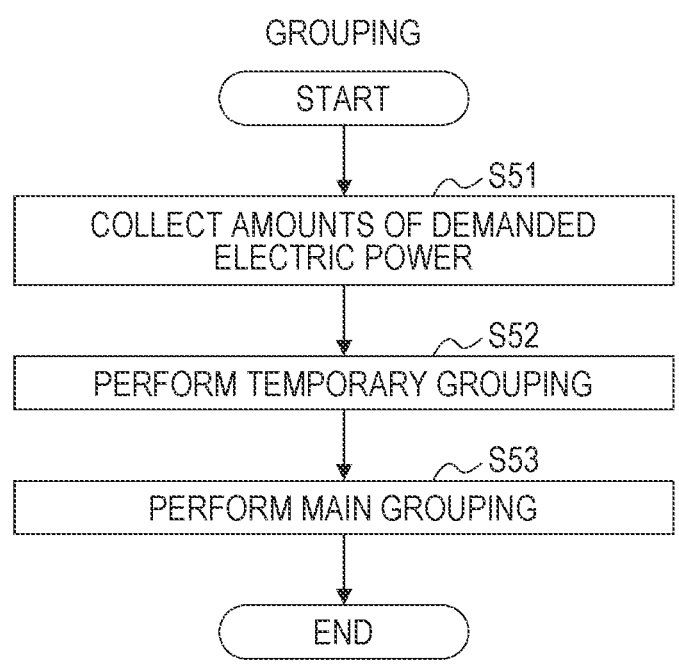
FIG. 13 is a flowchart illustrating an example of a grouping process.

FIGS. 12 to 14 are flowcharts illustrating an example of a routine which is performed by the CEMS server 2. Steps are realized through software processes which are performed by the CEMS server 2, but may be realized by hardware (electrical circuitry) provided in the CEMS server 2. In the following description, Step is abbreviated as S. FIG. 12 is a flowchart illustrating an example of a main routine of the CEMS server 2. This flowchart is performed when predetermined conditions are satisfied (for example, when a predetermined time elapses). This flowchart may be performed when the CEMS server 2 receives a command signal from an external device.

In Step S2, the CEMS server 2 performs a grouping process (the grouping phase). Then, in Step S4, the CEMS server 2 performs a simultaneous power supply and demand adjustment process (the simultaneous power supply and demand adjustment phase).

FIG. 13 is a flowchart illustrating an example of the grouping process. First, in Step S51, the CEMS server 2 collects amounts of demanded electric power from N consumer facilities. Then, in Step S52, the CEMS server 2 performs temporary grouping based on the N collected amounts of demanded electric power (see FIG. 9). Then, in Step S53, the CEMS server 2 additionally organizes the temporary groups to main groups. The group DB 284 is constructed by organization of the main groups.

FIG. 14 is a flowchart illustrating the simultaneous power supply and demand adjustment process. In S101, the CEMS server 2 determines whether a first half (for example, 15 minutes) of a target period of simultaneous power supply and demand adjustment has elapsed. When the first half of the target period of simultaneous power supply and demand adjustment has not elapsed yet (NO in S101), the CEMS server 2 ends the routine. When a second half of the target period of simultaneous power supply and demand adjustment has started (YES in S101), the CEMS server 2 causes the routine to proceed to S102. Division of the target period of simultaneous power supply and demand adjustment into the first half and the second half is only an example, and the target period may be divided into, for example, previous 10 minutes and subsequent 20 minutes.

In S102, the CEMS server 2 determines whether a predetermined adjustment cycle (the third period) has elapsed. The CEMS server 2 waits until the adjustment cycle elapses (NO in S102), and causes the routine to proceed to S103 when the adjustment cycle elapses (YES in S102).

In S103, the CEMS server 2 calculates an amount of electric power planned to be supplied from the power system 4 to the microgrid MG (a planned amount of electric power) in the first half of the target period of simultaneous power supply and demand adjustment. The planned amount of electric power is calculated according to a contract made in advance with a power company.

In S104, the CEMS server 2 calculates an amount of electric power actually supplied from the power system 4 to the microgrid MG (a total amount of demanded electric power) in the first half of the target period of simultaneous power supply and demand adjustment. As described above, it is possible to calculate the total amount of demanded electric power by integrating supply electric power detected in the power receiving and transforming facility 3 provided at a power receiving point of the microgrid MG.

In S105, the CEMS server 2 calculates a total adjusted amount of electric power kWh (total) using the planned amount of electric power calculated in S103, the total amount of demanded electric power calculated in S104, and Expression (1).

In S106, the CEMS server 2 acquires data on a current use state (where "use" includes generation, storage, consumption, and supply) of each power adjustment resource in the CEMS 1. This data includes data on currently used electric power of each power adjustment resource and data on whether to change used electric power (permission/prohibition of change). The CEMS server 2 determines candidates for a power adjustment resource which can be used to compensate for the total adjusted amount of electric power kWh (total) based on the acquired data.

In S107, the CEMS server 2 calculates an individual adjusted amount of electric power for each candidate determined in S106. Then, in S108, the CEMS server 2 generates a DR request such that simultaneous power supply and demand adjustment is achieved based on the total adjusted amount of electric power calculated in S105 and the individual adjusted amounts of electric power calculated in S107, and outputs the generated DR request.

In S109, the CEMS server 2 determines whether the whole target period of simultaneous power supply and demand adjustment (30 minutes) has elapsed. When the target period of simultaneous power supply and demand adjustment has not elapsed (NO in S109), the CEMS server 2 returns the routine to S102. Accordingly, the same process is performed in the next adjustment period. When the target period of simultaneous power supply and demand adjustment has elapsed (YES in S109), the CEMS server 2 ends the simultaneous power supply and demand adjustment process.

In the system that manages demand for electric power according to the related art, cases in which there is a plurality of consumer facilities are not considered, and there may be a problem in that the burden of a process of calculating a total amount of demanded electric power of the consumer facilities increases.

Therefore, in this embodiment, as illustrated in FIG. 4 and the like, a plurality of consumer facilities A1 to AN is organized to a plurality of groups G1 to GM. The plurality of groups G1 to GM includes a group including at least two consumer facilities of which the amounts of demanded electric power have a relationship (see FIG. 4). One consumer facility of the at least two consumer facilities includes an HEMS server 51 (the first communication system) that transmits an amount of demanded electric power of the corresponding consumer facility to the CEMS server 2 every first period (see FIG. 4). The CEMS server 2 calculates a total amount of demanded electric power of the plurality of groups based on the amount of demanded electric power transmitted from the HEMS server 51 and relationship information (see S104 in FIG. 14). The CEMS server 2 outputs a DR request to a plurality of consumer facilities such that the total amount of demanded electric power matches a planned amount of electric power (see S108 in FIG. 14).

In this way, when there is a group including at least two consumer facilities of which the amounts of demanded electric power have a relationship, the CEMS server 2 calculates the total amount of demanded electric power of the plurality of groups based on the amount of demanded electric power transmitted by the HEMS server 51 and the relationship information. Accordingly, in comparison with a "server that calculates a total amount of demanded electric power by reception from all of N consumer facilities," it is possible to decrease the burden of a process of calculating the total amount of demanded electric power. Particularly, even when there is a plurality of consumer facilities, the CEMS server 2 can curb an increase in the burden of a process of calculating the total amount of demanded electric power.

The plurality of consumer facilities A1 to AN includes the smart meter 52 (the second communication system) that transmits the amount of demanded electric power of the corresponding consumer facility to the CEMS server 2 every second period (1 hour) longer than the first period (1 second).

With this configuration, even when grouping is performed such that a plurality of consumer facilities includes the smart meter 52, it is possible to curb an increase in the burden of a process load for predicting demand for electric power in the consumer facilities. A new HEMS server 51 does not need to be provided in a charging facility not including the HEMS server 51 but including the smart meter 52, and thus it is possible to curb an increase in cost.

The CEMS server 2 calculates the total amount of demanded electric power every third period (1 minute) shorter than the second period (see S102 in FIG. 14). With this configuration, since the total amount of demanded electric power is calculated every third period, it is possible to calculate the total amount of demanded electric power at intervals of a relatively short cycle and to output a detailed response request.

The plurality of groups includes a group including one consumer facility including the first communication system (see the group G3 in FIG. 4). With this configuration, even when there is a group including one consumer facility including the first communication system, it is possible to curb an increase in the burden of the process load for predicting demand for electric power in the consumer facility.

The CEMS server 2 organizes a plurality of consumer facilities to a plurality of groups based on demand information associated with the amounts of demanded electric power in the plurality of consumer facilities (see FIG. 8). Accordingly, the CEMS server 2 can perform grouping based on the demand information associated with the amounts of demanded electric power.

As illustrated in FIG. 8, the demand information includes demand time periods of electric power in the consumer facilities. With this configuration, the CEMS server 2 can perform grouping based on the demand time periods of electric power in the consumer facilities.

As illustrated in FIG. 8, the demand information includes types of power adjustment resources. With this configuration, the CEMS server 2 can perform grouping based on the types of power adjustment resources.

MODIFIED EXAMPLES (1) In the embodiment, a configuration in which all of the plurality of consumer facilities A1 to AN include the smart meter 52 has been described. However, all of the plurality of consumer facilities A1 to AN do not need to include the smart meter 52. For example, A consumer facility E1 not including the smart meter 52 and the HEMS server 51 may be included in the plurality of consumer facilities A1 to AN. In this case, the consumer facility E1 transmits an amount of demanded electric power to a consumer facility E2 including one of the smart meter 52 and the HEMS server 51. Then, the consumer facility E2 transmits the amount of demanded electric power of the consumer facility E1 to the CEMS server 2. In this way, even when the consumer facility E1 not including the smarter meter and the HEMS server 51 is included in the plurality of consumer facilities A1 to AN, it is possible to achieve the same advantages as in the aforementioned embodiment.

(2) In the embodiment, a configuration in which the CEMS server 2 organizes all consumer facilities to temporary groups and additionally organizes the temporary groups to main groups as illustrated in FIG. 9 has been described above. However, the CEMS server 2 may not organize all the consumer facilities to the temporary groups but may directly organize the consumer facilities to the main groups. In the embodiment, a configuration in which the CEMS server 2 organizes all the consumer facilities to main groups based on demand information illustrated in FIG. 8 has been described above. However, the CEMS server 2 may organize all the consumer facilities to the main groups without using the demand information.

(3) In the embodiment, a configuration in which the CEMS server 2 performs both the grouping process and the simultaneous power supply and demand adjustment process as illustrated in FIG. 12 has been described above. However, at least a part of the routine performed by the CEMS server 2 may be performed by another device. For example, the grouping process may be performed by another device, and the simultaneous power supply and demand adjustment process may be performed by the CEMS server 2.

It should be understood that the embodiment described above in the present disclosure is exemplary but not restrictive in all respects. The scope of the present disclosure is not defined by the aforementioned description of the embodiment, but is intended to include all modifications within meanings and scopes equivalent to the appended claims.

What is claimed is:

1. A management server that manages an amount of demanded electric power of a plurality of consumer facilities, the management server comprising:
a processor; and
a memory configured to store a program which is able to be executed by the processor,
wherein the plurality of consumer facilities is organized into a plurality of groups,
wherein the plurality of groups includes a group including at least two consumer facilities of which amounts of demanded electric power are correlated with each other,
wherein a first consumer facility of the at least two consumer facilities includes a first communication system configured to transmit an amount of demanded electric power of the corresponding first consumer facility by supplying the amount of demanded electric power from a power network to the management server every first period,
wherein the memory is configured to store relationship information indicating a relationship between the amounts of demanded electric power of the at least two consumer facilities, and
wherein the processor is configured to:
calculate a total amount of demanded electric power of the plurality of groups based on the amount of demanded electric power transmitted from the first communication system and the relationship information; and perform feedback-control of one or more power adjustment resources for adjusting electric power by charging power to or discharging power from one or more of the consumer facilities in response to output a demand-response request to the plurality of consumer facilities such that the total amount of demanded electric power matches a planned amount of electric power; wherein the plurality of consumer facilities includes the first consumer facility and a second consumer facility, the first consumer facility including the first communication system, and the second consumer facility including a second communication system, wherein:

the first communication system is configured to supply an amount of demanded electric power of the corresponding first consumer facility to the management server every first period, the second communication system is configured to supply an amount of demanded electric power of the corresponding second consumer facility to the management server every second period, the second period being longer than the first period, and each of the plurality of groups includes at least one first consumer facility.

2. The management server according to claim 1, wherein the processor is configured to calculate the total amount of demanded electric power every third period shorter than the second period.

3. The management server according to claim 1, wherein the processor is configured to organize the plurality of consumer facilities into the plurality of groups based on demand information correlated with the amounts of demanded electric power of the plurality of consumer facilities.

4. The management server according to claim 3, wherein the demand information includes a demand time period of electric power in each consumer facility.

5. The management server according to claim 3, wherein the demand information includes a type of at least one of the one or more power adjustment resources.

6. A management method that is performed by a management server managing an amount of demanded electric power of a plurality of consumer facilities, wherein the plurality of consumer facilities is organized into a plurality of groups, wherein the plurality of groups includes a group including at least two consumer facilities of which amounts of demanded electric power are correlated with each other, wherein a first consumer facility of the at least two consumer facilities includes a first communication system configured to transmit an amount of demanded electric power of the corresponding first consumer facility by supplying the amount of demanded electric power from a power network to the management server every first period, wherein the management method comprises:

calculating a total amount of demanded electric power of the plurality of groups based on relationship information indicating a relationship between the amounts of demanded electric power of the at least two consumer facilities and the amount of demanded electric power transmitted from the first communication system; and performing feedback-control of one or more power adjustment resources for adjusting electric power by charging power to or discharging power from one or more of the consumer facilities in response to outputting a demand-response request to the plurality of consumer facilities such that the total amount of demanded electric power matches a planned amount of electric power; wherein the plurality of consumer facilities includes the first consumer facility and a second consumer facility, the first consumer facility including the first communication system, and the second consumer facility including a second communication system, wherein:

the first communication system is configured to supply an amount of demanded electric power of the corresponding first consumer facility to the management server every first period, the second communication system is configured to supply an amount of demanded electric power of the corresponding second consumer facility to the management server every second period, the second period being longer than the first period, and each of the plurality of groups includes at least one first consumer facility.

7. The management server according to claim 1, wherein the first period is one second, and the second period is 60 minutes.

8. The management server according to claim 1, wherein:

the plurality of groups includes a first group, a second group, and a third group;

power demand of a consumer facility in the first group is smaller in time periods of morning and evening, and the power demand of the consumer facility in the first group is larger in time periods of the daytime;

power demand of a consumer facility in the second group is larger in the time periods of morning and evening, and the power demand of the consumer facility in the second group is smaller in the time periods of the daytime; and power demand of a consumer facility in the third group is larger in time periods of early morning and midnight, and the power demand of the consumer facility in the third group is smaller in the other time periods.

* * * * *